Nov. 30, 1954   C. H. WARD ET AL   2,695,515
TIN PLATE TESTING
Filed June 24, 1948   4 Sheets-Sheet 1
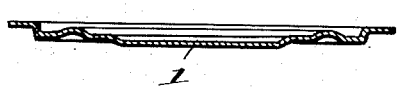
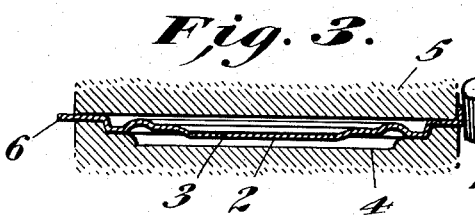
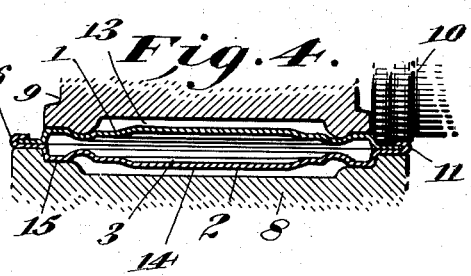
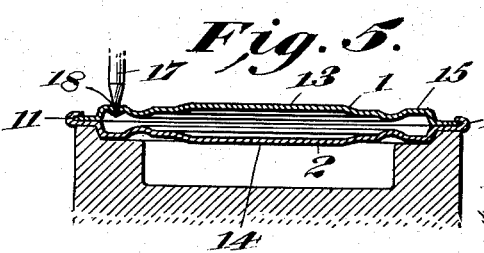
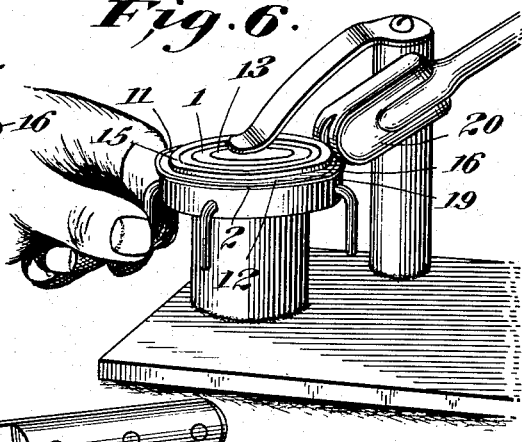
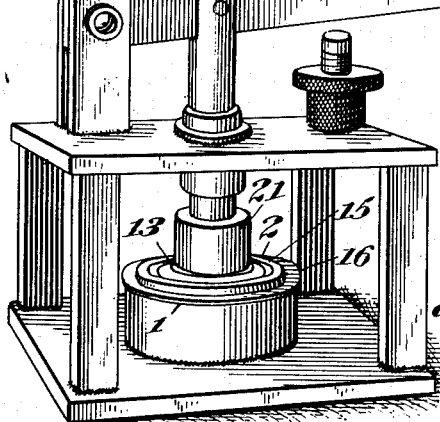
Inventors
Clemson H. Ward
and Harold K. Young.
By R. S. C. Dougherty
Attorney

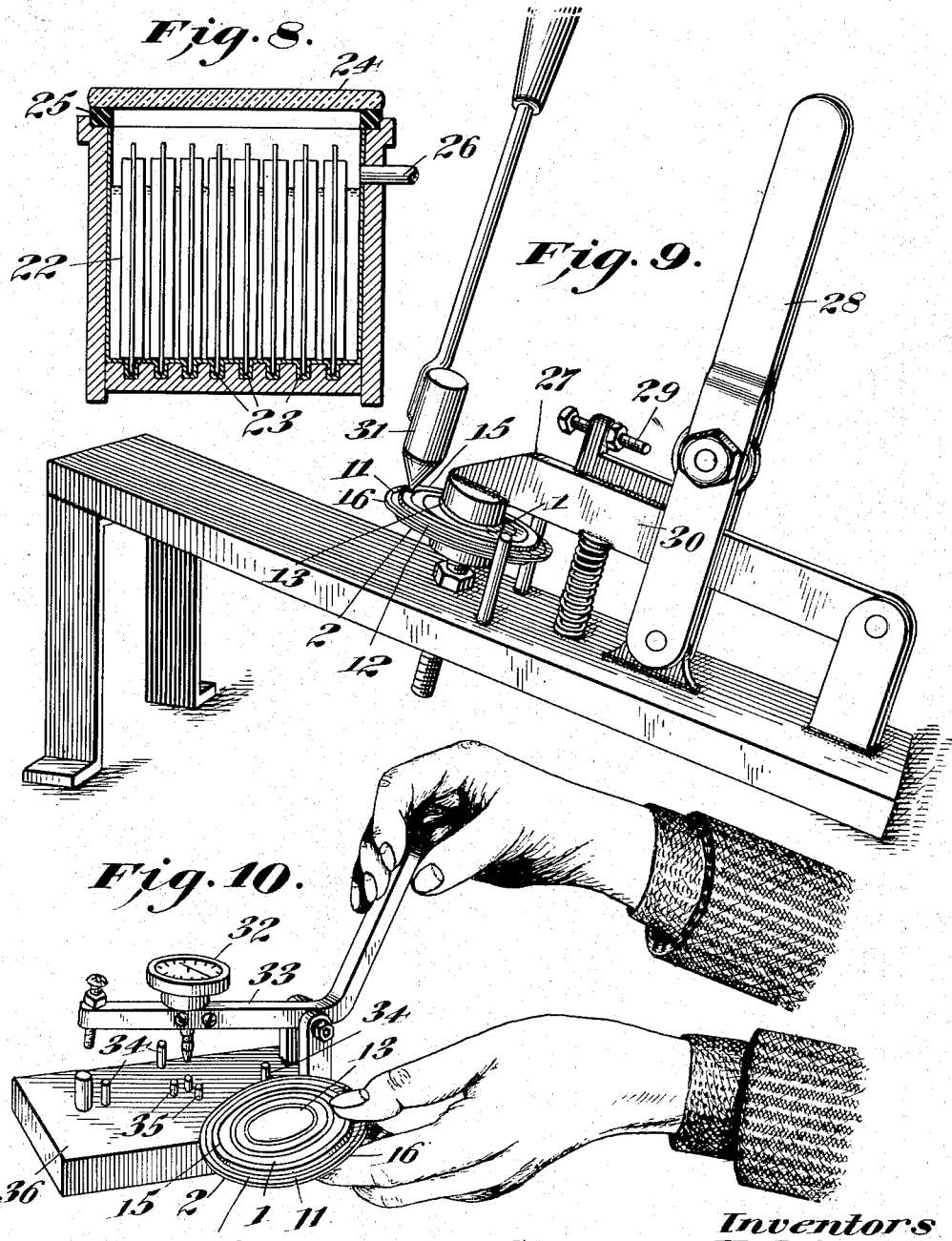

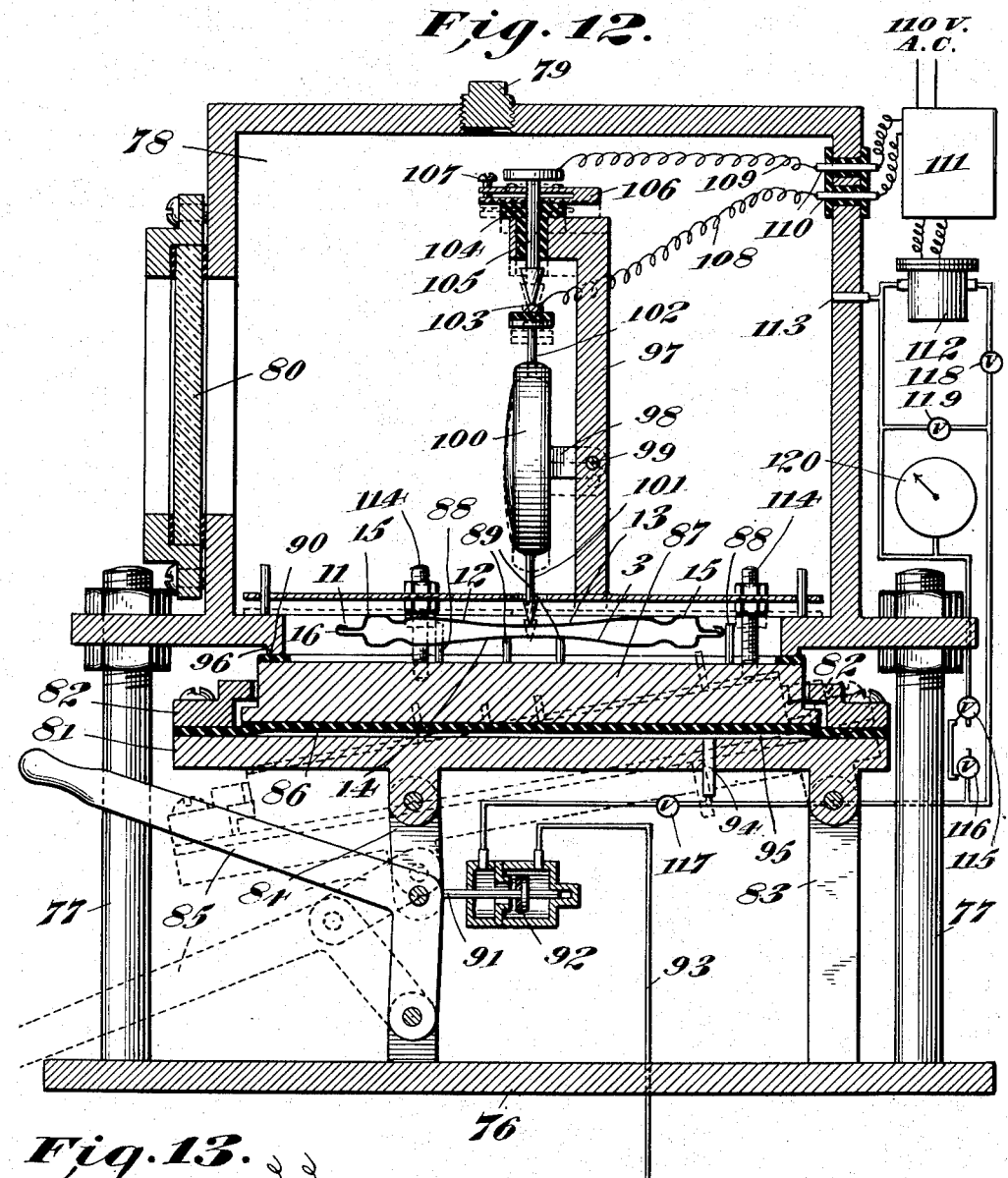

United States Patent Office
2,695,515
Patented Nov. 30, 1954

2,695,515

TIN PLATE TESTING

Clemson H. Ward and Harold K. Young, Baltimore, Md., assignors to Bethlehem Steel Company, a corporation of Pennsylvania Application June 24, 1948, Serial No. 34,866

13 Claims. (Cl. 73—37)

This invention relates to a method and apparatus for tin plate testing.

The virtually universal present use in containers for perishable foodstuffs of electrolytic tinplate, as a result of the post-war worldwide shortage of tin, has made the rapid checking of tin plate quality from the angle of pack spoilage a matter of great practical importance, not only for the canners, but also for the manufacture of tin plate.

In the past, with hot dipped tin plate and an abundance of tin, the tin plate manufacturers had relatively little difficulty in meeting the canners' requirements. The product was well standardized, and by means of steel analyses, coating weight determination and the hydrogen evolution test its manufacture was as readily controlled as that of most other steel mill products.

With the advent of electrolytic tin plate, however, both the quantity and kind of test information needed increased greatly. Variations in quality of product had to be determined, resulting not only from variations in coating practice and a widened range of coating weights but from variations in strip mill practice, which, in the case of electrolytic plate, developed new significance. The electrolytic process also offers opportunities for the progressive improvement of present types of plate and for the development of new products also requiring testing.

Plainly the best, if not the only, means of determining the suitability of tin plates for sanitary can manufacture is to expose the plates to food products in sealed containers. However, conventional can life tests are tedious, and assume the storage of several hundred full size cans for periods of 200 to 500 days. It is evident that can makers and packers cannot well be expected to make such tests for the tin plate mills covering all the variations in manufacturing technique which should be investigated, and to the extent that they may be willing to do so, there is necessarily involved much loss of time in arranging test programs, selecting and shipping samples, and following up test results. It is equally evident that the bulky can making and closing machinery, the considerable quantities of food and the labor and storage space required for regular can life tests can have no place in a steel mill laboratory.

One object of this invention, therefore, is to provide a shortened can test for accurately measuring at the steel mill the effects of corrosive foodstuffs on various types of tin plate by simple determinations of the quantity of gas evolved.

Another object is to provide a mill test which will determine the relative merits of plates for a given food pack.

Still other objects, purposes and advantages of the invention will appear hereinafter in the specification and in the appended claims; and in order to render the same more clear we shall now refer to the annexed four (4) sheets of drawings, in which like characters of reference will indicate like parts:

Figure 1 is a transverse section of a can end from which the extreme outer edge has been trimmed to reduce its diameter sufficiently to fit inside the curled edge of an untrimmed can end;

Fig. 2 is a similar section of a can end on which the full outer edge has been retained for curling;

Fig. 3 is a section of a can end as shown in Fig. 2, with its edge being curled by means of a curling die;

Fig. 4 is a section of a test can illustrating the method of seaming together the can ends shown in Figs. 1 and 3 by means of a seaming die;

Fig. 5 is a section of a test can showing the punching of a filler hole;

Fig. 6 is a perspective view illustrating the soldering of the edge seam;

Fig. 7 is a perspective view of a test can being adjusted to "zero flip" by means of a flip adjusting press;

Fig. 8 is a transverse section of a vacuum filling device for test cans;

Fig. 9 is a perspective view of a vacuum adjusting and sealing jig;

Fig. 10 is a perspective view of a device for measuring the thickness of a sealed test can;

Fig. 12 is a transverse vertical section of an air pressure operated volume and pressure tester for the secondary stage testing of sealed test cans; and Fig. 13 is a transverse vertical detail section of the solenoid valve shown in Fig. 12.

Figure 11:
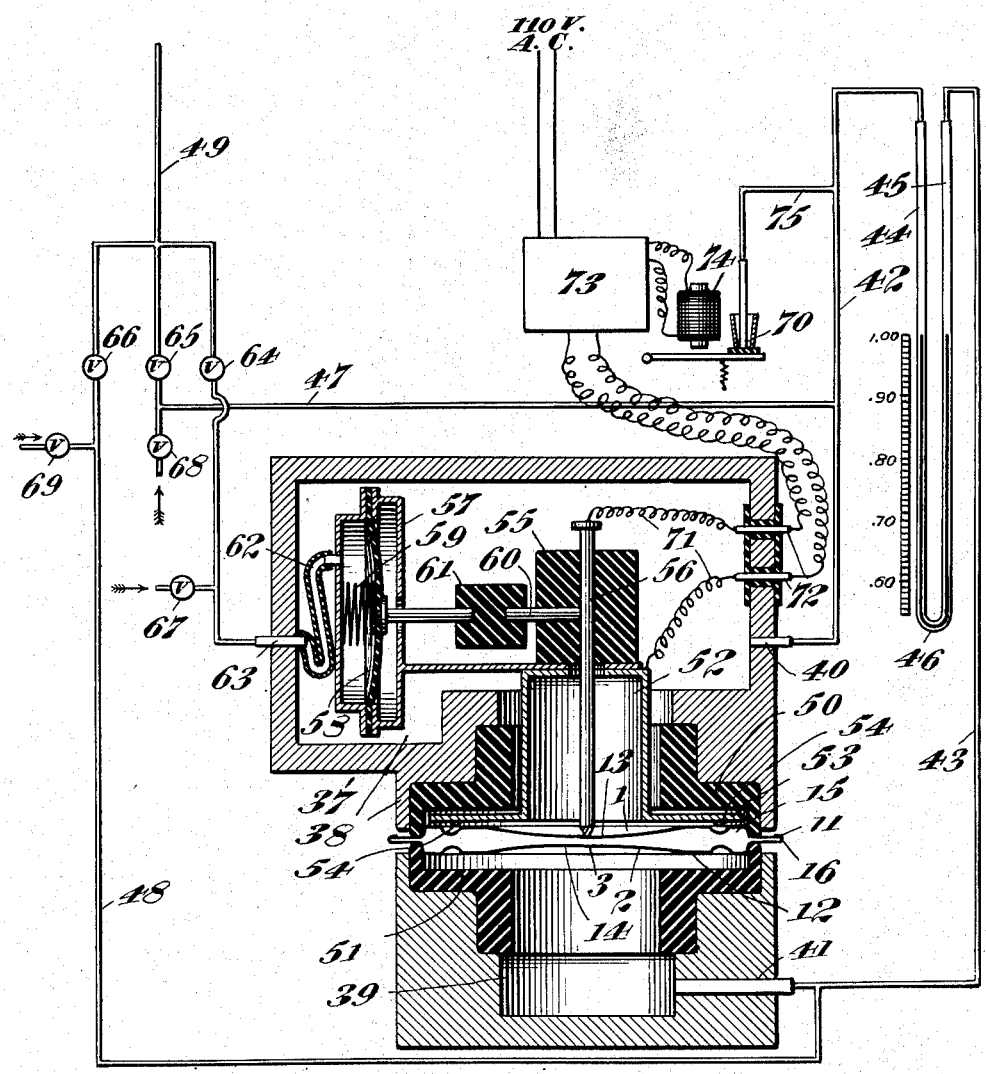
Fig. 11 is a transverse vertical section of a vacuum operated pressure tester for the initial testing of sealed test cans.

The familiar sanitary can, the most common type of packers' can, has a cylindrical body with a seam joint soldered outside, a stamped-out dish-shaped top end and an identical bottom end, both of these ends being secured to the body with a rubber-sealed double seam, the bottom end being attached by the can maker and the top end by the canner. For greater rigidity, and for resistance to pressures developed within the can, the standard can end has an annular raised outer corrugation from which the can end is progressively stepped down toward the center.

We have discovered that for the limited purposes of a mill test, for which comparative rather than absolute values are desired and sufficient, a substantially flat test can, made of a pair of standard can ends without an interposed body portion has certain special advantages, particularly in tests involving fluid packs such as milk and fruit juices.

For the purpose of illustration, we have found that a test can having a total volume of from 15 to 20 cubic centimeters may be made from a pair of #2 can ends. One quart of fruit juice will fill about 60 cans. They may be stored in wooden racks measuring 4" x 4" x 18" and holding 40 cans. The storage space required per can is therefore about one-tenth that for standard #2 cans, and per unit of tin plate under test, about one-half.

Starting with can ends made on an ordinary punch press, the making, filling, sealing and testing of the test cans may be carried out with inexpensive hand operated equipment. Assuming the use of two #2 can ends, the outer edge of the upper can end 1 is first trimmed down about 1/3 inch, as shown in Fig. 1. The lower can end 2 is clamped with its concave surface 3 upward on the recessed turntable 4 by means of the upper curling die 5, and the projecting outer edge 6 of said can end is then curled upward as in regular can manufacturing practice by the pressure of the skewed side roller 7. The cut-down can end 1 is fitted into the other curled end 2 with their concave surfaces facing each other. The assembled can ends are clamped together on the turntable 8, as shown in Fig. 4, by means of the seaming die 9, and seamed together by pressure from the horizontal roller 10 to form edge seam 11. The result is the disc-shaped test can or container 12 shown in Fig. 6, about 2½" in diameter by ¼" thick, with flexible upper and lower central portions 13 and 14, a raised rigid rim 15 and a ¼" concentric edge 16 made up of two thicknesses of plate, and having the normally outside surfaces of the can ends on the inside of the can.

As in Fig. 5, one side of the can is then pierced by a sharp punch 17 to form the filler hole 18 near the extreme edge of the can, the side at the same time being bent inward slightly. Any small hand punch press can do this conveniently. Rotating the can on a small hand turntable 19, as in Fig. 6, the edge seam 11 is then soldered with a notched iron 20, and the side opposite the filler hole 18 is then pressed in the hand press 21 shown in Fig. 7 to give it "zero flip."

The pressure required to attain "zero flip" will vary with the gauge and temper of the plate. As the can end comes from the punch press, considerable external pressure is required on the center of the end to snap it inward and make it stay in this position, but if pressure is applied near the outer ring and the entire end bent inward, a point is reached where the center will snap out to its normal convex shape but can be prevented from doing so (when once snapped inward) by a very light pressure. This condition of zero flip is important in later determining the true pressure in the can.

A number of cans may be filled by the vacuum filler 22 shown in Fig. 8, or similar means, with a measured quantity of fruit juice or the like. As shown, said vacuum filler 22 has vertical can retaining pockets 23, a glass cover plate 24, sealing means 25, and rubber hose 26 to a vacuum source.

The normal empty volume of the can with sides convex is about 20 cc. A convenient practice, therefore, is to put about 14 cc. of food juice in the can and to allow about 1.5 to 2.5 cc. of gas content (air, oxygen or nitrogen as desired). By squeezing the sides inward to a predetermined spacing, either by external mechanical pressure as in the adjusting jig 27 shown in Fig. 9 or by setting up an internal vacuum, to give this total volume of 15.5 to 16.5 cc., and closing the filler hole with a drop of solder, on release an initial vacuum of 10 to 15 inches of mercury is established in the can through the resilience of the sides. For example, with the can supported on said jig 27, when the spring-supported hand lever 28 is at the extreme left against the stop 29, the pivoted pressure arm 30 will force excess liquid out of the filler hole; and when said lever 28 is in the upright position shown, a fixed quantity of air is drawn in and the filler hole is soldered shut with the iron 31, after which the can is released by fully retracting said lever 28. If desired, the volume can be reduced in this manner to as little as 11 or 12 cc. without permanently deforming the sides. Rapid verification of thickness may be made with the dial gage 32 on the lever arm 33, against the can mounted on supporting pins 34 and centering pins 35 on base 36, as in Fig. 10.

The cans may be tested for gas content before sterilizing, in order that the change in gas during processing may be determined, and then sterilized by boiling or other regular procedures before storage.

Storage of the test cans is preferably in vertical position, in slotted racks within insulated cabinets, with the closed filler holes kept uppermost in the head space, not only to prevent possible local attack around the hole but to serve as position indicators, assuming a fairly uniform solution line in the can during storage. Temperatures during storage should be kept fairly constant since any rise in temperature will increase the rate of corrosion just as in the case of standard cans.

The equipment shown in Fig. 11 is used in the initial test of the can, immediately after filling and sealing but before sterilizing, when the pressure in the can is always less than atmospheric. The test is applicable only to test cans which have been pre-flipped so that one side (in Fig. 11 the bottom side) flips outward when the internal and external pressures applied to this side are substantially equal.

The vacuum test unit 37 initially applied to the can 12 basically comprises two hollow chambers 38 and 39, having connections 40 and 41 which are connected by tubes 42 and 43 to the two arms 44 and 45 of differential manometer 46 and independently supplied with vacuum through tubes 47 and 48 from vacuum line 49. Said chambers are provided with rubber sealing and insulating cups 50 and 51, which under the influence of a vacuum form airtight seals gripping the rigid rim 15 of the can.

In the upper chamber 38 is located an inverted cup-shaped structure 52 which is supported independently of the enclosing rubber cup 50 by an integral projecting annular flange 53 having three contact feet 54 resting on the can rim 15. Said structure 52 supports an insulating sleeve 55, preferably of Bakelite or the like, in which a contact pin 56 is slidably carried, and also a vacuum case 57 containing a diaphragm 58 and spring 59 which actuate a locking pin 60 through insulator 61. The vacuum case 57 is connected by flexible tubing 62 through connector 63 to vacuum line 49, said vacuum line 49 having control valves 64, 65 and 66, release valves 67, 68 and 69, and relief valve 70. Structure 52 and contact pin 56 are electrically connected through flexible leads 71 and insulated airtight terminals 72 to electronic relay 73 connected to a current-actuated solenoid 74 adapted to operate relief valve 70. Because their only support, as shown, is upon the rigid can rim 15, said structure 52 and contact pin 56 are not affected by slight movements of chamber 38 and its sealing cup 50 which may result from the application of vacuum thereto. By following the sequence of steps in the initial test procedure, the operation of this equipment will be readily understood.

With release valve 67 closed and control valve 64 open the test can 12 is inserted between the cups 50 and 51. Vacuum acting upon diaphragm 58 compresses spring 59 and by retracting locking pin 60 permits contact pin 56 to rest upon the flexible top center surface 13 of the can. The contact tip of pin 56 together with the three supporting feet 54 of structure 52 therefore define the approximately spherical surface of the can top in the manner of the conventional spherometer.

Control valve 64 is then closed and release valve 67 opened, permitting pin 60 to frictionally lock pin 56 in its vertical position under the influence of spring 59. When in this condition the contact pin 56 completes an electrical circuit through the can, supporting structure 52 and the control elements of the electronic relay 73, which by de-energizing solenoid 74 results in the opening of relief valve 70.

Release valve 68 is next closed and control cock 65 partially opened or throttled. This results in a flow of air through open relief valve 70 to the vacuum line 49 and by reason of friction in the small orifice of said relief valve 70 and the connecting lines 75 and 42 there is established a slight vacuum in the upper chamber 38.

Release valve 69 is then closed and control valve 66 is gradually opened, causing a build-up of vacuum in lower chamber 39.

As the vacuum in chamber 39 increases the bottom surface of the test can is drawn outward, here downward, until, when the vacuum in said chamber 39 equals that inside the test can, the bottom of the can flips. During the downward movement of the can bottom, however, the volume of the can increases and the internal pressure correspondingly decreases so that the vacuum in said lower chamber 39, and hence the internal pressure in the can at this time, is not the true initial pressure in the can, nor does it bear any known relation to it.

The purpose of the upper chamber 38 and its associated equipment is to determine and automatically compensate for this decrease in internal pressure during the flipping operation.

As the bottom surface of the test can moves downward under the influence of vacuum in lower chamber 38, the pressure difference between the pressure upon the external surface 13 of the top of the can (which is approximately atmospheric to start with) and the pressure upon its internal surface (which is the decreasing internal pressure of the can) increases. The top of the can is therefore deflected downward and breaks contact with pin 56. Re-energized solenoid 74 closes relief valve 70 causing build-up of vacuum in upper chamber 38. This draws the top of the can upward, it makes contact and the cycle is repeated.

In actual operation, relief valve 70 flutters at the rate of 10 to 20 cycles per second, maintaining the center of the can top within about .0001″ of its initial position. The corresponding gradual increase of vacuum in chamber 38 will keep pace with the increasing vacuum in the can to within about plus or minus .01 atmosphere.

The vacuum in lower chamber 39 is applied to arm 45 of mercury manometer 46. With arm 44 open to atmospheric pressure the manometer would therefore indicate the vacuum in said lower chamber 39, which, at the flip point, would indicate the sum of the initial vacuum in the can plus the increase due to flipping. Arm 44, however, is connected to upper chamber 38, and hence the vacuum therein opposes the effect of the vacuum in the lower chamber 39. The resultant indication of the manometer at the flip point is therefore the above sum, minus the increase, as explained above, or the desired initial pressure within the can.

By multiplying the pressure in atmospheres as thus determined by the volume of gas (air) in cubic centimeters in the can, in accordance with Boyle's law of gases, as expressed in the formula $pV=p_1V_1$, wherein $p$ and $p_1$ are the initial pressure and the final pressure, and V and $V_1$ are the initial and final volumes, respectively, the initial gas quantity in cubic centimeters at one atmosphere is obtained. In the case of cans this equation takes the form $$V = \frac{(p+K-C)(V-X)}{p}$$

where V is the required initial volume, $p$ the initial pressure within the can, K is the external pressure applied, C is the pressure equivalent to the increased resistance of the can to inward deformation and X is the change in volume as measured by thickness change.

It is evident that C is not a constant for a given thickness change in all cans. However, by assigning to it an average value and by making K relatively high the error involved in using this equation is reduced to a satisfactory level. Expressed in more practical terms, if the external pressure used is high enough, the initial gas volume is reduced near enough to zero so that the volume change becomes a satisfactory measure of initial volume.

The initial gas (air) volume in the can is determined by compressing it under relatively high external air pressure and measuring the resultant change in thickness.

It is also perfectly feasible to determine the external pressure required to compress the can to a definite thickness, and hence to a known gas volume. Using a standard thickness of 0.140 inch, which is only slightly less than the normal thickness of the can as filled, the external initial pressure in this case will be low, usually less than 0.2 atmosphere.

The gas quantity increase throughout the life of the can is measured from time to time by compressing the can to a known gas volume, that is, either to its initial thickness or to another predetermined thickness as described above, and measuring the external pressure required for this compression, in the air pressure operated device shown in Fig. 12.

Referring now to Fig. 12, the base 76 of the pressure device is provided with upright pedestals 77 on which is mounted the pressure chamber 78 open at bottom and having a removable top plug 79 and side window 80. Bottom plate 81 provided with side retainer members 82 is pivoted beneath said pressure chamber 78 on the rear support 83 and toggle 84 with its lever 85. Secured by said retainer members 82 on a flexible diaphragm 86 over said bottom plate 81 is the closure plate 87 having on its upper face the three can-centering pins 88 and supporting pins 89. Said supporting pins 89 are set in a circle of diameter large enough to provide a stable support for the test can 12 and small enough to represent approximately the position of the center of its expansible bottom surface.

With the hinged bottom plate 81 of the chamber 78 dropped open, as shown in dotted lines, the test can 12 is placed upon the supporting pins 89 and centered thereon by the pins 88.

The can is then raised into the pressure chamber 78 by moving toggle lever 85 to the position shown in full lines in Fig. 12. In this position, the plate 87, which supports the can, also seals the pressure chamber 78 by means of gasket 90.

On closing the chamber, the toggle 84 will pass with ease slightly beyond its center position. When it reaches this position it strikes the plunger 91 of the spring-closed poppet valve 92 in air line 93, thereby admitting air pressure through connection 94 to space 95 between bottom plate 81 and diaphragm 86. By this means, plate 87 is forced into uniform air-tight engagement with the sealing gasket 90 and the bottom rim 96 of the pressure chamber 78. The opening of said poppet valve 92 also initiates the testing operation.

Pressure chamber 78 has therein an inverted T-shaped structure 97, on which is mounted by lug 98 and pin 99 a dial indicator 100, having a lower contact pin 101 and an upper insulated flat-topped stem 102 carrying a small top plate 103. Mounted above said dial indicator 100 on the structure 97 is an insulating bushing 104, holding a slidable contact pin 105 and a split member 106 adjustable by means of screw 107.

Plate 103 and contact pin 105 are each connected electrically through flexible leads 108 and 109 and insulated air tight terminals 110 to the control elements of electronic relay 111 which in turn is connected to the solenoid valve 112 (Fig. 13) connected between air line 93 and inlet connection 113 to the chamber 78.

When the pressure chamber 78 is closed (solid lines), the structure 97 is supported by three adjusting screws 114 upon the closure plate 87, so that the structure 97 and the members which it carries remain in fixed vertical relationship to the pins 89 which support the test can 12, regardless of any relative motion of chamber 78 and plate 87 which may result from the application of pressure to the chamber.

The tip of the lower contact pin 101 of the dial indicator 100 rests upon the center of the upper surface of the test can, and with reference to the plane defined by the tops of the supporting pins 89 establishes a measure of can dimension which may be arbitrarily referred to as "thickness." By means of screws 114 the indicator 100 is adjusted so that zero on the dial scale corresponds to .140" thickness.

With the lower contact pin 101 set at a point corresponding to this thickness, adjustable member 106 is set by means of the screw 107 through the opening normally closed by the plug 79 so that upper contact pin 105 just breaks contact with plate 103. For a thickness greater than .140" said pin 105 remains in contact with and is supported by the plate 103. Breaking the contact between plate 103 and pin 105 results in closing the solenoid valve 112.

The sequence of operations in the initial pressure test of a can is as follows: With release valves 115 and 116 closed, throttling valves 117 and 118 suitably adjusted and by-pass valve 119 closed, the pressure chamber 78 is closed. Upon closing said chamber the poppet valve 92 admits air through valves 117 and 118 and solenoid valve 112 to the chamber 78. The test can 12 is compressed by the increasing pressure in the chamber and its thickness decreases.

As previously explained, the cans are preferred to be sealed at thicknesses ranging from .140 to .150". Assuming the can illustrated has an initial thickness of .145" air will continue to flow into the chamber until the can is compressed to .140". At this point contact will be broken between 103 and 105 and solenoid valve 112 will close. The pressure at this point is read on gauge 120 and is recorded as "initial external pressure" for use in subsequent tests.

If, as sometimes happens, a can is sealed at a thickness less than .140", contact will not be made when the can is inserted and the chamber closed. In this case the initial thickness is read on the dial gauge 100 through window 80 and is recorded as "initial thickness." "Initial external pressure" in this case is zero.

After determining either initial pressure or thickness as above described, by-pass valve 119 is opened and the pressure allowed to build up to 100 lbs. per sq. in. At this point the decrease in thickness is noted—either from .140" or from the actual initial thickness.

In tests subsequently made throughout the life of the can, the pressure chamber is used to determine the increased external pressure necessary to compress the can to .140" or to its initial thickness (hence to its initial gas volume).

Before closing the chamber, the movable scale of gauge 120 is set to a negative value corresponding to the "initial external pressure" if a normal can is to be tested or to zero if a "thin" can is to be tested. This permits a direct reading of the "increased pressure" from the gauge.

Upon closing the chamber, pressure builds up as previously described until a thickness of .140" is reached at which time the "increased pressure" is read. For "thin" cans additional pressure is applied through by-pass valve 119 until the initial thickness is reached at which time "increased pressure" is read. Tests made in this equipment require from three to fifteen seconds, depending upon the condition of the can.

Practical operating aids may include a throttling valve (not shown) in series with by-pass valve 119, and the mechanical coupling of release valves 115 and 116 so that valve 115 will open slightly in advance of valve 116 in order to avoid blowing the gasket 90 when pressure under diaphragm 86 is released.

Although we have hereinabove shown and described our invention in considerable detail, we do not wish to be limited to the exact structures and procedures so shown and described; but we may also use such substitutions, modifications or equivalents thereof as are embraced within the scope and spirit of the invention, or pointed out in the appended claims.

We claim:

1. An apparatus for determining the internal vacuum in a test container having two expansible members adapted to flip outwardly when a substantially equal external vacuum is applied thereto, comprising a vacuum chamber for applying flipping vacuum externally to an expansible member of the container, a second vacuum chamber for applying vacuum to the second expansible member, means for measuring the pressure differential between the vacuum chambers, and means for regulating the vacuum of said second chamber, said means being controlled by the second expansible member so as to maintain a substantially constant position of said second expansible member during the application of flipping vacuum to the first expansible member.

2. An apparatus for determining the internal pressure in a test container having two expansible members, comprising a vacuum chamber for applying flipping vacuum externally to an expansible member of the container, a second vacuum chamber for independently applying vacuum externally to the second expansible member, means for regulating the vacuum of said second chamber, said means being under control of the position of said second expansible member, and a manometer connected to said vacuum chambers for determining the numerical difference in intensity of said vacua at the instant of flip.

3. A method of determining the internal pressure in a container having a pair of expansible members adapted to flip responsively to substantial equalization of internal and external pressures, comprising applying flipping vacuum externally to an expansible member of the container, independently applying vacuum externally to a second expansible member so that said second member is held in substantially constant position, measuring the quantitative difference between said vacua to establish the true initial vacuum, permitting gas to evolve through corrosion in the container and expand the container, applying external pressure to both members simultaneously until the container has been compressed to its original dimensions, and taking said latter external pressure as a measure of the evolved gas increase.

4. A method of determining the corrosion resistance of tin plate, comprising the steps of forming a test can of the tin plate, filling said test can with a foodstuff or the like, sealing said can with a partial vacuum therein, applying flipping vacuum externally to one end of said can, independently applying vacuum externally to the opposite end of the can, measuring the difference between said vacua at the instant of flip to establish the true internal pressure, compressing both ends of the can simultaneously to establish the true initial volume, subsequently recompressing the can to substantially original thickness, and measuring the pressure increase due to gas evolution in the can.

5. A method of determining through evolved gas measurements the corrosion resistance of tin plate, comprising the steps of forming a test can by soldering together a pair of standard can ends of the specimen tin plate with the normally outside can end surfaces on the inside of said test can, adjusting at least one end of said test can by mechanical pressure to approximate zero flip, filling said test can with measured quantity of foodstuff or the like, squeezing the can ends together and then sealing the test can so that a partial vacuum is created therein, applying flipping vacuum externally to the preadjusted end of the test cans, independently applying vacuum externally to the opposite can end so that said opposite end is held in substantially constant position, and measuring the difference between the two latter vacua at the instant of flip to establish the true initial pressure, then compressing both ends of said test can simultaneously under high external pressure to establish the initial volume, sterilizing the test can, subsequently recompressing both ends of the can under external fluid pressure to substantially original thickness at sealing, and measuring said compression in terms of pressure increase and dimensional change.

6. An apparatus for determining changes in the thickness of a container under changes in external pressure, comprising a chamber for receiving said container, a thickness measuring gauge in contact with said container having an element movable in unison with movements of said container, an electrical circuit including said element, said circuit being adapted to open upon movement of said element beyond a predetermined distance, a fluid pressure supply means, a valve between said supply means and said chamber, means to open said valve to admit fluid pressure to said chamber, means responsive to the opening of said circuit to close said valve, and means to measure the pressure within said chamber.

7. An apparatus for determining the internal pressure in a container having two flexible members one of which is adapted to flip when the pressures internally and externally of said container are substantially equal, comprising a first chamber having an aperture for receiving said flippable member in sealing engagement therewith, a second chamber having an aperture for receiving said second member in sealing engagement therewith, means for applying fluid pressure to said flippable member in said first chamber to flip same, means for applying fluid pressure to said second member in said second chamber in an amount sufficient to prevent movement of said second member in response to the pressure applied to said first member, and means for measuring the difference in the amount of pressure applied to said chambers.

8. An apparatus for determining the internal pressure in a container having two flexible members one of which is adapted to flip when the pressures internally and externally of said container are substantially equal, comprising a first chamber having an aperture for receiving said flippable member in sealing engagement therewith, a second chamber having an aperture for receiving said second member in sealing engagement therewith, means for applying fluid pressure to said flippable member in said first chamber to flip same, means for applying fluid pressure to said second member in said second chamber in an amount sufficient to prevent movement of said second member in response to the pressure applied to said first member, said last mentioned means including an electrical circuit responsive to movement of said second member, fluid pressure supply means, valve means between said supply means and said chamber and means for operating said valve in response to changes in said electrical circuit, and means for measuring the difference in the amount of pressure applied to said chambers.

9. An apparatus for determining the internal pressure in a container having two flexible members one of which is adapted to flip when the pressures internally and externally of said container are substantially equal, comprising a first chamber having an aperture for receiving said flippable member in sealing engagement therewith, a second chamber having an aperture for receiving said second member in sealing engagement therewith, means for applying fluid pressure to said flippable member in said first chamber to flip same, means for applying fluid pressure to said second member in said second chamber in an amount sufficient to prevent movement of said second member in response to the pressure applied to said first member, said means including an electrical circuit including as elements thereof said flexible member and a contact element adjacent thereto, a fluid pressure supply, valve means between said supply and said chamber, means to open said valve upon a change in said electrical circuit and to close said valve when said circuit is restored to normal condition, and means for measuring the difference in the amount of pressure applied to said chambers.

10. An apparatus for determining the internal pressure in a container having two flexible members, comprising means for applying pressure to one of said members, means for applying pressure to the second of said members to prevent movement thereof in response to the pressure applied to said first member, and means to measure the difference in said applied pressures.

11. A method of determining the internal pressure in a container having two flexible members one of which is adapted to flip when the pressures internally and externally of said container are substantially equal, comprising applying pressure to said flippable member in an amount sufficient to flip the same, applying pressure to said other flexible member, limiting the pressure applied to said second flexible member to an amount just sufficient to prevent movement thereof in response to the pressure applied to said flippable member, and measuring the difference in said applied pressures.

12. A method of determining the volume of gas within a container having two flexible members one of which is adapted to flip when the pressures internally and externally of said container are substantially equal, comprising: (a) determining the internal pressure within the container, (b) thereafter applying pressure to the container, (c) measuring the change in thickness of the container resulting from such applied pressure, and (d) determining the volume of the gas in the container by means of the equation $$V = \frac{(p+K-C)(V-X)}{p}$$

in which:

$V$ = the volume to be determined,
$p$ = internal pressure determined as set forth in step (a) hereof,
$K$ = the pressure applied in step (b) hereof,
$C$ = the pressure equivalent to the resistance of the container to inward deformation, and
$X$ = the change in volume of the container equivalent to the change in thickness determined in step (c) hereof.

13. A method of determining changes in the volume of gas within a container containing a gas-evolving substance and having two flexible members one of which is adapted to flip when the pressures internally and externally of said containers are substantially equal, comprising: (a) determining the pressure and volume of gas initially within the container, (b) permitting the evolution of gas within the container, (c) compressing the container to its original thickness, (d) measuring the pressure required for such compression, and (e) determining the volume of gas within the container by means of the equation $$Vp = V'p'$$

in which:

$V$ = the volume to be determined,
$p$ = pressure determined as set forth in step (d) hereof,
$V'$ = volume determined as set forth in step (a) hereof, and
$p'$ = pressure determined as set forth in step (a) hereof.

References Cited in the file of this patent

UNITED STATES PATENTS

| Number | Name | Date |
|---|---|---|
| 885,682 | Zimmerman | Apr. 21, 1908 |
| 933,847 | Paine | Sept. 14, 1909 |
| 1,447,701 | White | Mar. 6, 1923 |
| 1,567,794 | Finley | Dec. 29, 1925 |
| 1,650,736 | Zelov | Nov. 29, 1927 |
| 1,839,376 | Cropper | Jan. 5, 1932 |
| 1,956,301 | Richardson | Apr. 24, 1934 |
| 1,974,026 | Hicks | Sept. 18, 1934 |
| 2,422,702 | Rodanet | June 24, 1947 |
| 2,453,338 | Pajak | Nov. 9, 1948 |
| 2,512,134 | Baule | June 20, 1950 |
| 2,534,123 | Hasselhorn | Dec. 12, 1950 |
| 2,561,204 | Johnson | July 17, 1951 |

OTHER REFERENCES

Circular of the Bureau of Standards, No. 46, December 26, 1922.